US011133592B2

(12) United States Patent
Kang et al.

(10) Patent No.: US 11,133,592 B2
(45) Date of Patent: Sep. 28, 2021

(54) CHIP RADIO FREQUENCY PACKAGE AND RADIO FREQUENCY MODULE

(71) Applicant: Samsung Electro-Mechanics Co., Ltd., Suwon-si (KR)

(72) Inventors: Ho Kyung Kang, Suwon-si (KR); Seong Jong Cheon, Suwon-si (KR); Hak Gu Kim, Suwon-si (KR); Young Sik Hur, Suwon-si (KR); Jin Seon Park, Suwon-si (KR); Yong Duk Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/891,200

(22) Filed: Jun. 3, 2020

(65) Prior Publication Data

US 2021/0242594 A1 Aug. 5, 2021

(30) Foreign Application Priority Data

Feb. 5, 2020 (KR) ........................ 10-2020-0013915

(51) Int. Cl.

*H04B 1/28* (2006.01)
*H01Q 9/04* (2006.01)
*H01Q 5/35* (2015.01)
*H01Q 1/38* (2006.01)
*H01Q 1/22* (2006.01)

(52) U.S. Cl.

CPC ......... *H01Q 9/0414* (2013.01); *H01Q 1/2283* (2013.01); *H01Q 1/38* (2013.01); *H01Q 5/35* (2015.01)

(58) Field of Classification Search

CPC ....... H01Q 9/0414; H01Q 5/35; H01Q 1/2283
USPC .......................................................... 343/702
See application file for complete search history.

(56) References Cited

U.S. PATENT DOCUMENTS 10,453,804 B2 10/2019 Kamgaing et al.
2016/0141245 A1* 5/2016 Choi .................. H01L 23/5227 257/369
2019/0173195 A1 6/2019 Kim et al.

FOREIGN PATENT DOCUMENTS

KR 10-1190920 B1 10/2012
KR 10-2019-0066940 A 6/2019

* cited by examiner

*Primary Examiner* — Peguy Jean Pierre
(74) *Attorney, Agent, or Firm* — NSIP Law

(57) ABSTRACT

A radio frequency module is provided. The module includes a core member, a front-end integrated circuit (FEIC), a first connection member, a second connection member disposed on an upper surface of the core member, a radio frequency integrated circuit (RFIC) disposed on an upper surface of the second connection member, and configured to input or output a base signal and a first radio frequency (RF) signal having a frequency higher than a frequency of the base signal, through a wiring layer, a substrate disposed on a lower surface of the first connection member; and an electrical connection structure configured to electrically connect the first connection member and the substrate. The FEIC is configured to input or output the first RF signal and a second RF signal which has a power different from a power of the first RF signal.

18 Claims, 13 Drawing Sheets

CHIP RADIO FREQUENCY PACKAGE AND RADIO FREQUENCY MODULE

CROSS-REFERENCE TO RELATED APPLICATION(S)

This application claims the benefit under 35 USC § 119(a) of Korean Patent Application No. 10-2020-0013915, filed on Feb. 5, 2020, in the Korean Intellectual Property Office, the entire disclosure of which is incorporated herein by reference for all purposes.

BACKGROUND

1. Field

The following disclosure relates to a chip radio frequency package and a radio frequency module.

2. Description of Related Art

Data traffic for mobile communications systems is increasing rapidly every year. Systems that support the transmission of such rapidly increased data in real time in wireless networks are currently being implemented. For example, the contents of internet of things (IoT) based data, augmented reality (AR), virtual reality (VR), live VR/AR combined with SNS, autonomous navigation, applications such as Sync View (real-time video user transmissions using ultra-small cameras), and the like may benefit from communications systems (e.g., 5G communications, mmWave communications, etc.) that support the transmission and reception of large amounts of data.

Millimeter wave (mmWave) communications, including 5th generation (5G) communications, have been implemented in communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a chip radio frequency package includes a core member including a through-hole, a core insulating layer and a core via disposed to penetrate the core insulating layer; a front-end integrated circuit (FEIC) disposed in the through-hole; a first connection member, disposed on a lower surface of the core member, and having a first stacked structure in which at least one first insulating layer and at least one first wiring layer are alternately stacked, and the first wiring layer is electrically connected to the core via; a second connection member, disposed on an upper surface of the core member, having a second stacked structure in which at least one second insulating layer and at least one second wiring layer are alternately stacked, and the second wiring layer is electrically connected to the core via; and a radio frequency integrated circuit (RFIC) disposed on an upper surface of the second connection member, and configured to input or output a base signal and a first radio frequency (RF) signal having a frequency higher than a frequency of the base signal, through the at least one second wiring layer, wherein the FEIC is configured to input or output the first RF signal and a second RF signal which has a power different from a power of the first RF signal.

The FEIC may be configured to input or output the first RF signal and the second RF signal in a downward direction.

The first connection member may be disposed below the core member, and the second connection member may be disposed above the core member.

The chip radio frequency package may include a first encapsulant that encapsulates the FEIC in the through-hole.

The FEIC may be disposed between the first connection member and the second connection member.

A side surface of the through-hole may be perpendicular to an upper surface of the core member.

The core member may further include a plating layer disposed on a side surface of the through-hole.

The FEIC may be electrically connected to the plating layer.

At least a portion of the FEIC may overlap the RFIC in a vertical direction.

The chip radio frequency package may further include a second encapsulant that encapsulates at least a portion of the RFIC on an upper surface of the second connection member.

In a general aspect, a radio frequency module includes a core member including a through-hole, a core insulating layer and a core via disposed to penetrate the core insulating layer; a front-end integrated circuit (FEIC) disposed in a through-hole of the core member; a first connection member, disposed on a lower surface of the core member, and having a first stacked structure in which at least one first insulating layer and at least one first wiring layer are alternately stacked, and the first wiring layer is electrically connected to the core via, a second connection member, disposed on an upper surface of the core member, having a second stacked structure in which at least one second insulating layer and at least one second wiring layer are alternately stacked, and the second wiring layer is electrically connected to the core via; a radio frequency integrated circuit (RFIC) disposed on an upper surface of the second connection member, and configured to input or output a base signal and a first radio frequency (RF) signal having a frequency higher than a frequency of the base signal, through the at least one second wiring layer; a substrate disposed on a lower surface of the first connection member; and an electrical connection structure configured to electrically connect the first connection member and the substrate, wherein the FEIC is configured to input or output the first RF signal and a second RF signal which has a power different from a power of the first RF signal.

The substrate may include a patch antenna pattern configured to transmit or receive the first RF signal or the second RF signal; and a feed via configured to feed the patch antenna pattern.

The first connection member may be disposed below the core member, and the second connection member is disposed above the core member.

The FEIC may be disposed between the first connection member and the second connection member.

The core member may further include a plating layer disposed on a side surface of the through-hole.

A lower surface of the first connection member may be smaller than an upper surface of the substrate.

In a general aspect, a first connection member including a first insulating layer and a first wiring layer; a second connection member including a second insulating layer and a second wiring layer; a core member disposed between the first connection member and the second connection member, and configured to be electrically connected to the first wiring layer and the second wiring layer; a radio frequency integrated circuit (RFIC), disposed above the second connection member, and configured to process a base signal and a first radio frequency (RF) signal, and a front-end signal integrated circuit (FEIC), disposed in a through-hole of the core member, and configured to amplify the first RF signal to generate a second RF signal, or amplify the second RF signal to generate the first RF signal, wherein the FEIC is configured to process the first RF signal and a second RF signal which has a power different from a power of the first RF signal.

The core member further comprises a first plating layer disposed on a side surface of the through-hole, and a second plating layer disposed on an outer wall of the core member.

Other features and aspects will be apparent from the following detailed description, the drawings, and the claims.

Figure 1A:
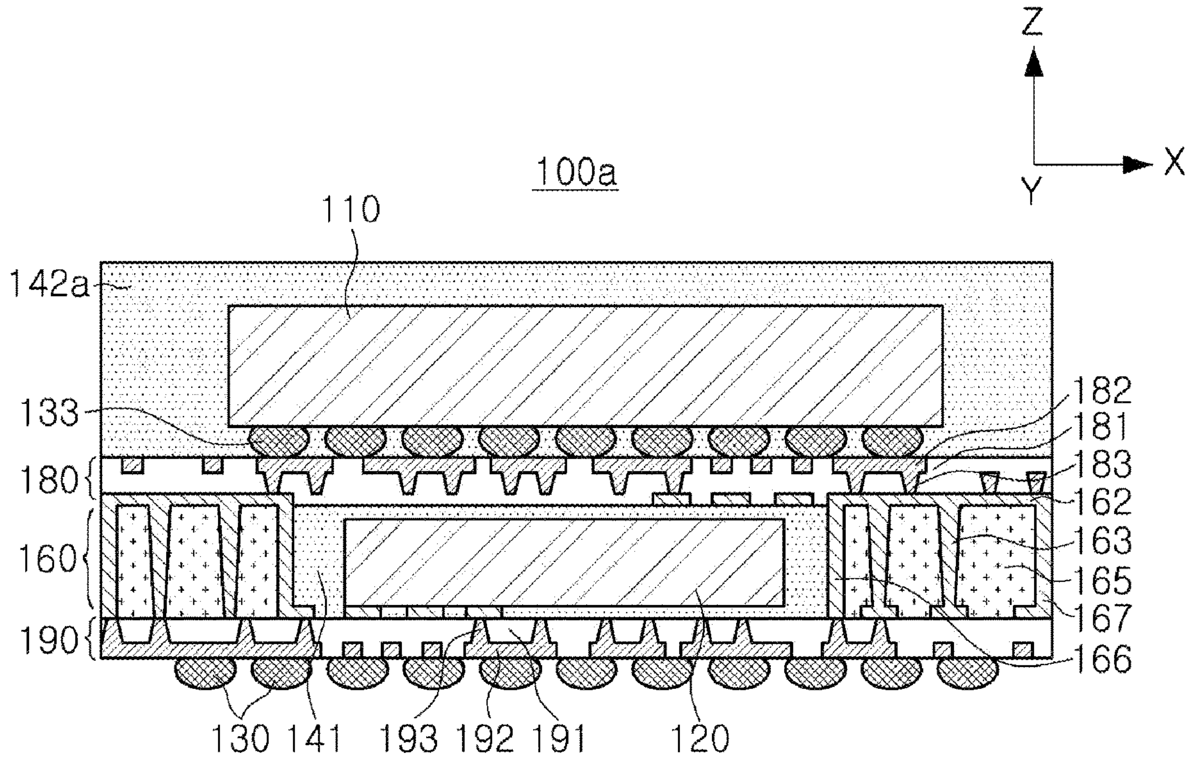
FIGS. 1A to 1D are side views illustrating an example chip radio frequency package, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of the application, may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

FIG. 1A is a side view illustrating an example chip radio frequency package, in accordance with one or more embodiments.

Referring to FIG. 1A, an example chip radio frequency package 100*a* according to an example may include a radio frequency Integrated Circuit (IC) (RFIC) 110 and a front-end IC (FEIC) 120. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The RFIC 110 may input and/or output a base signal and a first radio frequency (RF) signal having a frequency higher than a frequency of the base signal.

In an example, the RFIC 110 may process the base signal (e.g., frequency conversion, filtering, phase control, etc.) to generate a first RF signal, and process the first RF signal to generate the base signal.

The FEIC 120 may input and/or output the first RF signal and a second RF signal having a power different from a power of the first RF signal.

For example, the FEIC 120 may amplify a first RF signal to generate a second RF signal, and amplify a second RF signal to generate a first RF signal. In an example, the amplified second RF signal may be remotely transmitted by an antenna, and the second RF signal remotely received from the antenna may be amplified by the FEIC 120.

In an example, the FEIC 120 may include at least a portion of a power amplifier, a low noise amplifier, and a transmission/reception conversion switch, as non-limiting examples. In an example, the power amplifier, the low noise amplifier, and the transmission/reception conversion switch may be implemented as a combination structure of a semiconductor transistor element and an impedance element, but are not limited thereto.

Since the FEIC 120 may amplify the first RF signal and/or the second RF signal, the RFIC 110 may not include a front-end amplification circuit (e.g., a power amplifier, or a low noise amplifier).

Since securing the performance (e.g., power consumption, linearity properties, noise properties, size, gain, etc.) of the front-end amplification circuit may be more difficult than securing the performance of a circuit performing operations other than amplification in the RFIC 110, compatibility for a circuit performing operations other than amplification in the RFIC 110 may be relatively low.

In an example, the front-end amplification circuit may be implemented as a type of IC, other than a typical CMOS-based IC (for example, a compound semiconductor), or may be configured to have an efficient structure to receive an impedance of a passive element, or may be optimized for a specific required performance to be implemented separately, thereby securing performance.

Accordingly, the example chip radio frequency package 100*a* may have a structure in which the FEIC 120 that performs a front-end amplification operation, and the RFIC 110 that performs an operation, other than the front-end amplification operation, are implemented separately, such that the performance of an amplification circuit and the performance of a circuit that performs operations other than front-end amplification of the RFIC 110 are secured together.

Additionally, power consumption and/or heat generation of the front-end amplification circuit 120 may be greater than power consumption and/or heat generation of the circuit that performs operations other than the front-end amplification of the RFIC 110.

The chip radio frequency package 100*a* according to an example may have a structure in which the FEIC 120 that performs a front-end amplification operation, and the RFIC 110 that performs an operation other than front-end amplification may be implemented separately, such that an efficiency of power consumption may be increased, and a heating path may be more efficiently distributed.

Energy loss when transmitting the first RF signal and/or the second RF signal may increase as the power of the first RF signal and/or the second RF signal increases. In an example in which the implementation of the FEIC 120 that performs a front-end amplification operation is separate from the RFIC 110 that performs operations other than the front-end amplification, since the FEIC 120 may be implemented in a manner in which it is electrically connected closer to an antenna, an electrical length of a transmission path to an antenna of the final amplified second RF signal may be shortened more easily, and an energy efficiency of the chip radio frequency package 100*a* may be further improved.

Although a total size of the RFIC 110 and the FEIC 120 may be larger than the size of the RFIC integrated with the front-end amplification circuit, the chip radio frequency package 100*a* according to an example may have a structure in which the RFIC 110 and the FEIC 120 may be disposed in a compressed manner.

Referring to FIG. 1A, an example chip radio frequency package 100*a* may include a core member 160, a first connection member 190, and a second connection member 180.

The core member 160 may include a core insulating layer 165 and a core via 163 disposed to penetrate the core insulating layer 165.

The first connection member 190 may have a first stacked structure in which at least one first insulating layer 191, and at least one first wiring layer 192 are alternately stacked. The at least one first wiring layer 192 may be electrically connected to the core via 163, and the first insulating layer 191 and the at least the one first wiring layer 192 may be disposed on a lower surface of the core member 160.

In an example, the first connection member 190 may have a structure in which it is built up below the core member 160. Accordingly, a first via 193, that may be included in the first connection member 190, may have a structure in which a width of a lower end of the first via 193 is greater than a width of an upper end thereof.

The second connection member 180 may have a second stacked structure in which at least one second insulating layer 181 and at least one second wiring layer 182 are alternately stacked. The at least one second wiring layer 182 may be electrically connected to the core via 163, and the second insulating layer 181 and the at least one second wiring layer 182 may be disposed on an upper surface of the core member 160.

In an example, the second connection member 180 may have a structure in which it is built up above the core member 160. Therefore, a second via 183, that may be included in the second connection member 180, may have a structure in which a width of an upper end second via 183 is greater than a width of a lower end thereof.

The RFIC 110 may be disposed on an upper surface of the second connection member 180, and may input and/or output a base signal and a first RF signal through at least one second wiring layer 182.

The core member 160 may surround a through-hole in which the FEIC 120 may be disposed in a horizontal direction (e.g., an x-direction, a y-direction), and the first connect member 190 and the second connection member 180 may be disposed to overlap in a vertical direction (e.g., a z direction) in the through-hole.

Accordingly, since the RFIC 110 and the FEIC 120 may be disposed in a compressive manner with each other, an actual size of the chip radio frequency package 100*a* may be reduced, and may be less than or equal to the size of the chip radio frequency package implemented with an RFIC integrated with the front-end amplification circuit.

Additionally, since the second connection member 180 may be disposed between the RFIC 110 and the FEIC 120, electromagnetic isolation between the RFIC 110 and the FEIC 120 may also be improved.

The RFIC 110 and the FEIC 120 may overlap each other in the vertical direction (e.g., the z direction). Accordingly, the RFIC 110 and the FEIC 120 may be disposed in a more compressive manner.

A plurality of electrical connection structures 130 may be disposed on a lower surface of the first connection member 190. In a non-limiting example, the plurality of electrical connection structures 130 may be implemented with solder balls, pads, or lands, as just examples.

In an example, the FEIC 120 may input or output first and second RF signals in a downward manner. Accordingly, since wiring complexity of the second connection member 180 may be reduced, the second connection member 180 may stably provide a compact internal space for the wiring electrically connected to the RFIC 110. Additionally, electromagnetic isolation between the RFIC 110 and the FEIC 120 may be further improved.

In an example, the side surface of the through-hole may be perpendicular to the upper surface of the core member 160. That is, an inner wall facing the FEIC 120 from the core member 160 may be perpendicular to the upper surface of the core member 160. The vertical side surface of the through-hole may be formed due to a symmetrical structure in the vertical direction of the through-hole in the core member 160.

In an example, a first encapsulant 141 may be filled in a portion of the through-hole where the FEIC 120 is not located. The first encapsulant 141 may support the first connection member 190 and the second connection member 180 when the first connection member 190 and the second connection member 180 are built up.

In an example, a second encapsulant 142*a* may encapsulate at least a portion of the RFIC 110 on the upper surface of the second connection member 180. Accordingly, the chip radio frequency package 100*a* according to an example may be a standardized electronic component, and may have a structure that is easy to be mass-produced, distributed, and used, and the RFIC 110 may be protected from external elements.

In an example, the core member 160 may further include a first plating layer 166 disposed on a side surface of the through-hole. Accordingly, electromagnetic isolation to the exterior of the FEIC 120 may be improved.

In an example, the core member 160 may further include a second plating layer 167 disposed on an outer wall of the core member 160.

Figure 1B:
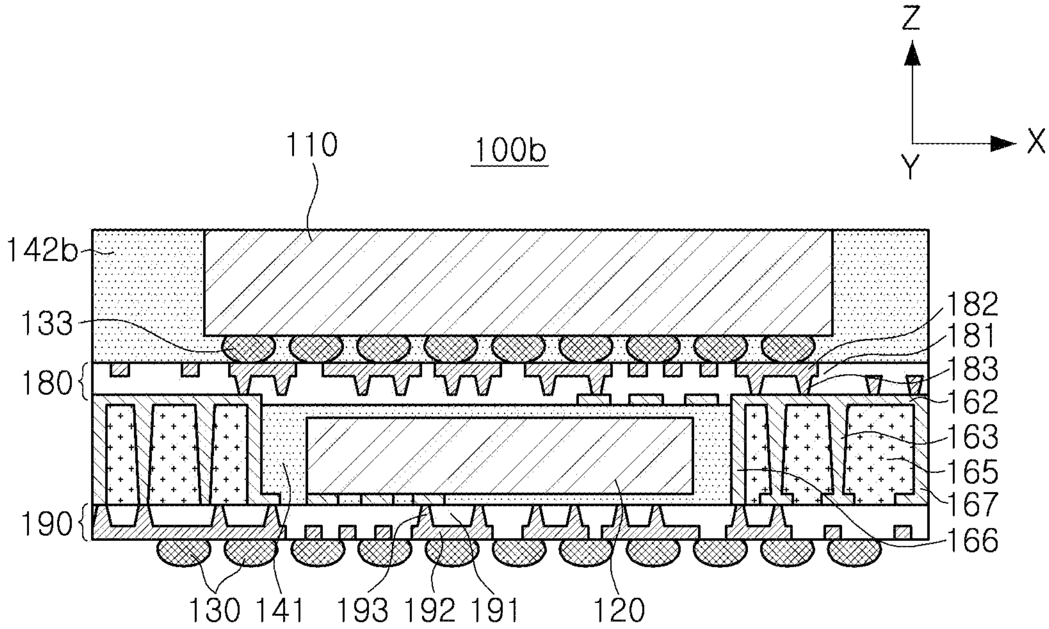
Figure 1C:
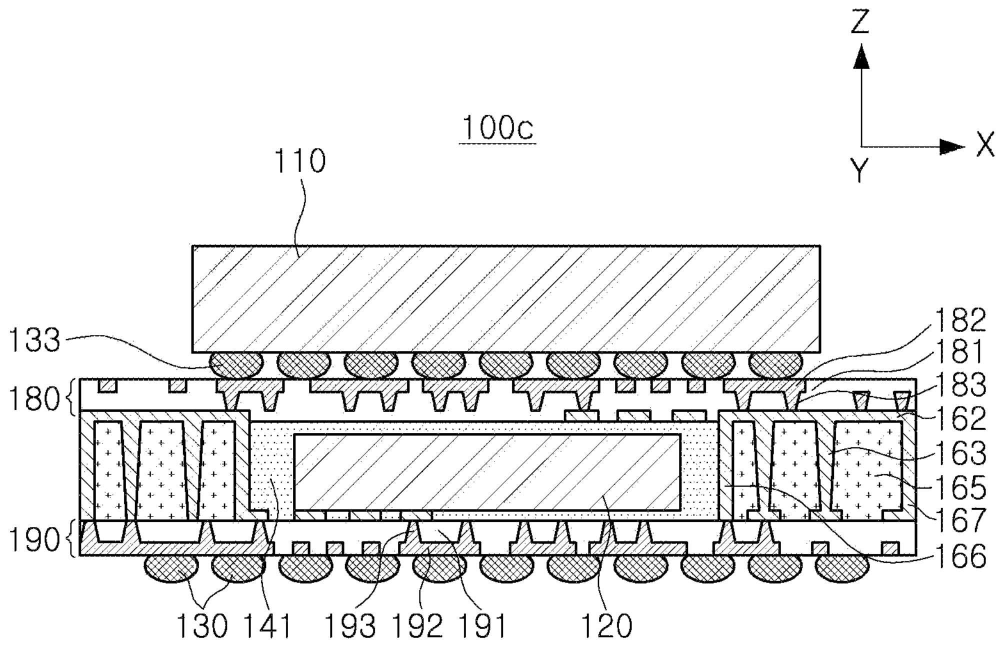
Figure 1D:
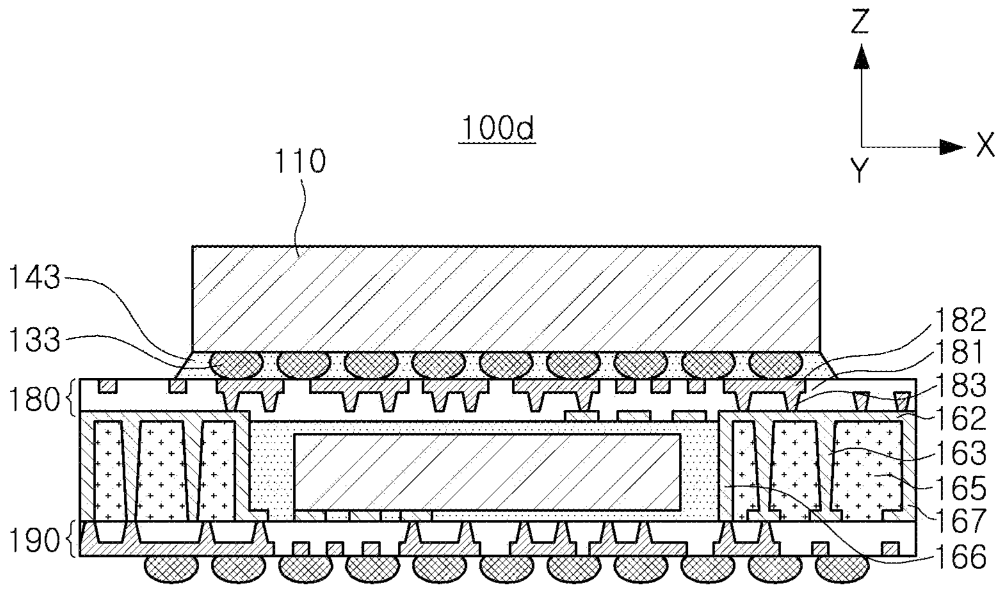

FIGS. 1B to 1D are side views illustrating an example chip radio frequency package, in accordance with one or more embodiments.

Referring to FIG. 1B, an example chip radio frequency package 100*b* may include a second encapsulant 142*b* having a shorter thickness than the second encapsulant 142*a* shown in FIG. 1A.

Referring to FIG. 10, an example chip radio frequency package 100*c*, in accordance with one or more embodiments, may have a structure in which the second encapsulant shown in FIGS. 1A and 1B is omitted.

Referring to FIG. 1D, an example chip radio frequency package 100*d*, in accordance with one or more embodiments, may include a second encapsulant 143 that encapsulates a plurality of third electrical connection structures 133. The plurality of third electrical connection structures 133 may support mounting of the RFIC 110 on the upper surface of the second connection member 180.

Figure 2A:
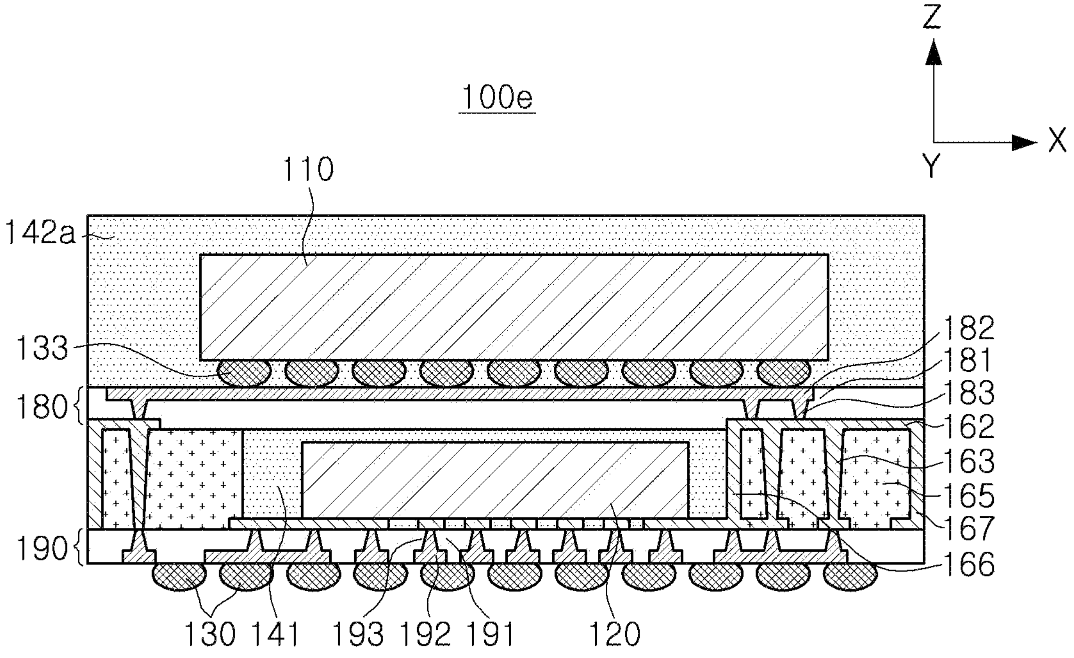
FIGS. 2A to 2C are side views illustrating an example chip radio frequency package, in accordance with one or more embodiments.
Figure 2B:
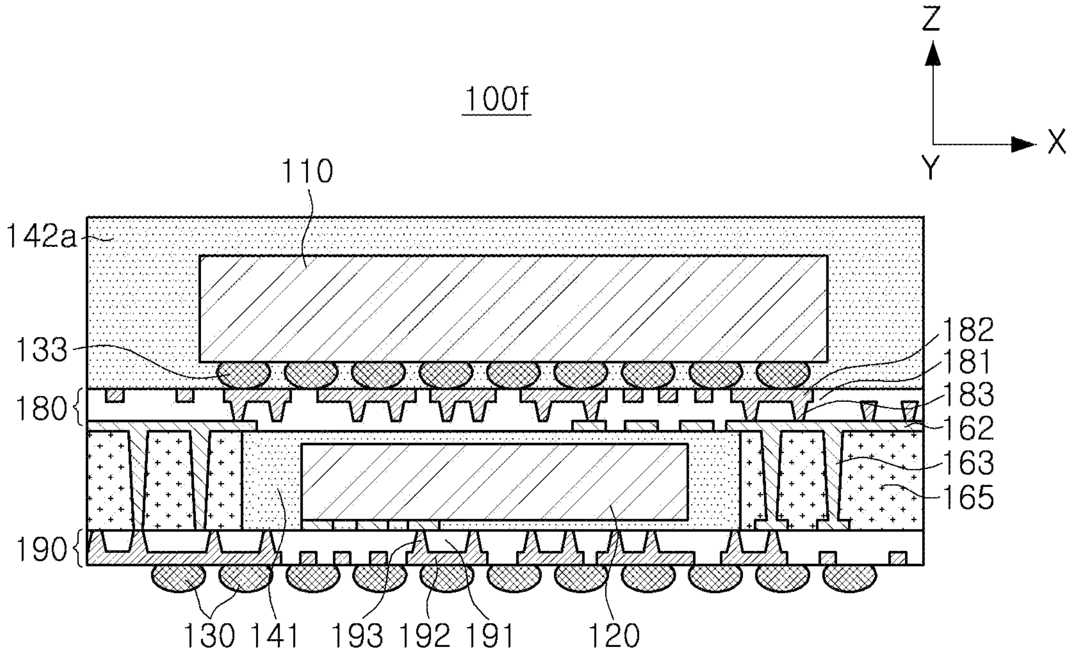
Figure 2C:
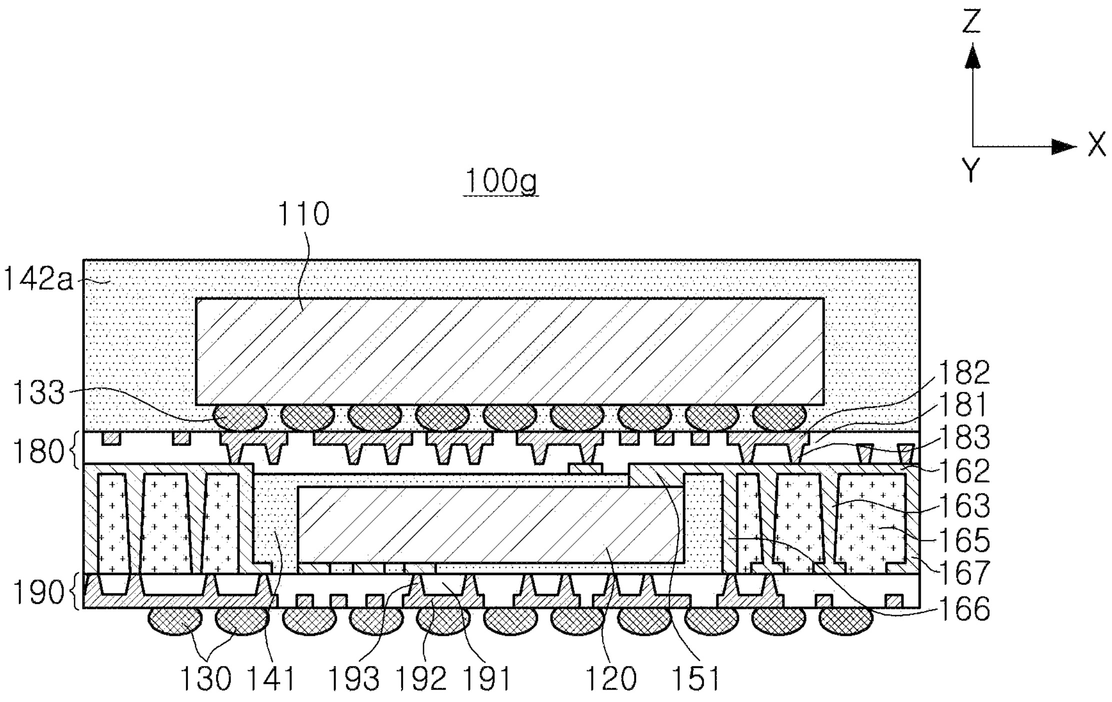

FIGS. 2A to 2C are side views illustrating an example chip radio frequency package, in accordance with one or more embodiments.

Referring to FIG. 2A, an example chip radio frequency package 100*e*, in accordance with one or more embodiments, may have a first wiring layer 192 modified from a structure of at least one first wiring layer shown in FIG. 1A, and may have a second wiring layer 182 modified in a structure of at least one second wiring layer shown in FIG. 1A.

Referring to FIG. 2B, an example chip radio frequency package 100*f*, in accordance with one or more embodiments, may have a structure in which the first and second plating layers shown in FIG. 1A are omitted.

Referring to FIG. 2C, an example chip radio frequency package 100*g*, in accordance with one or more embodiments, may further include a heat dissipation member 151, which may be electrically connected between the FEIC 120 and the first plating layer 166. Accordingly, heat dissipation of the FEIC 120 may be further improved.

Figure 3:
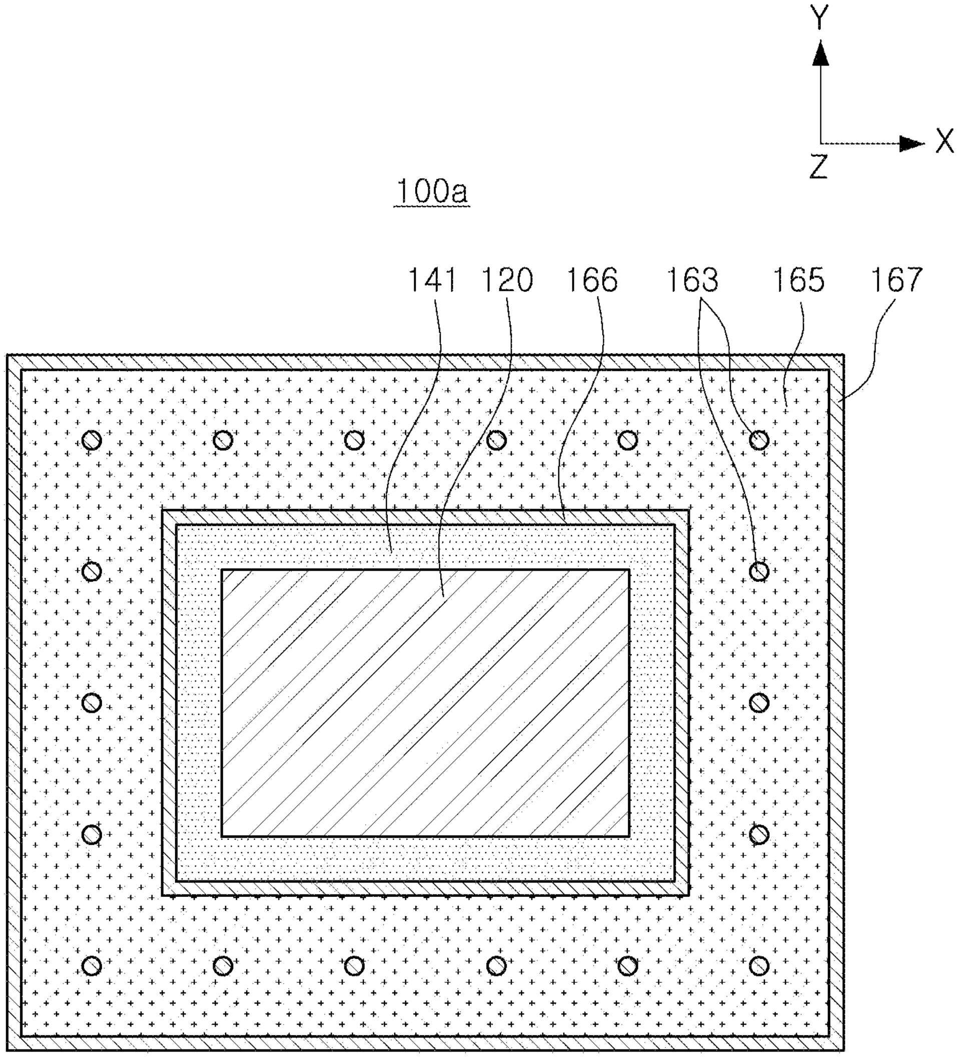
FIG. 3 is a plan view illustrating an example chip radio frequency package, in accordance with one or more embodiments.

FIG. 3 is a plan view illustrating an example chip radio frequency package, in accordance with one or more embodiments.

Referring to FIG. 3, a core insulating layer 165 of the example chip radio frequency package 100*a* may surround the FEIC 120, and may include a plurality of core vias 163.

Figure 4A:
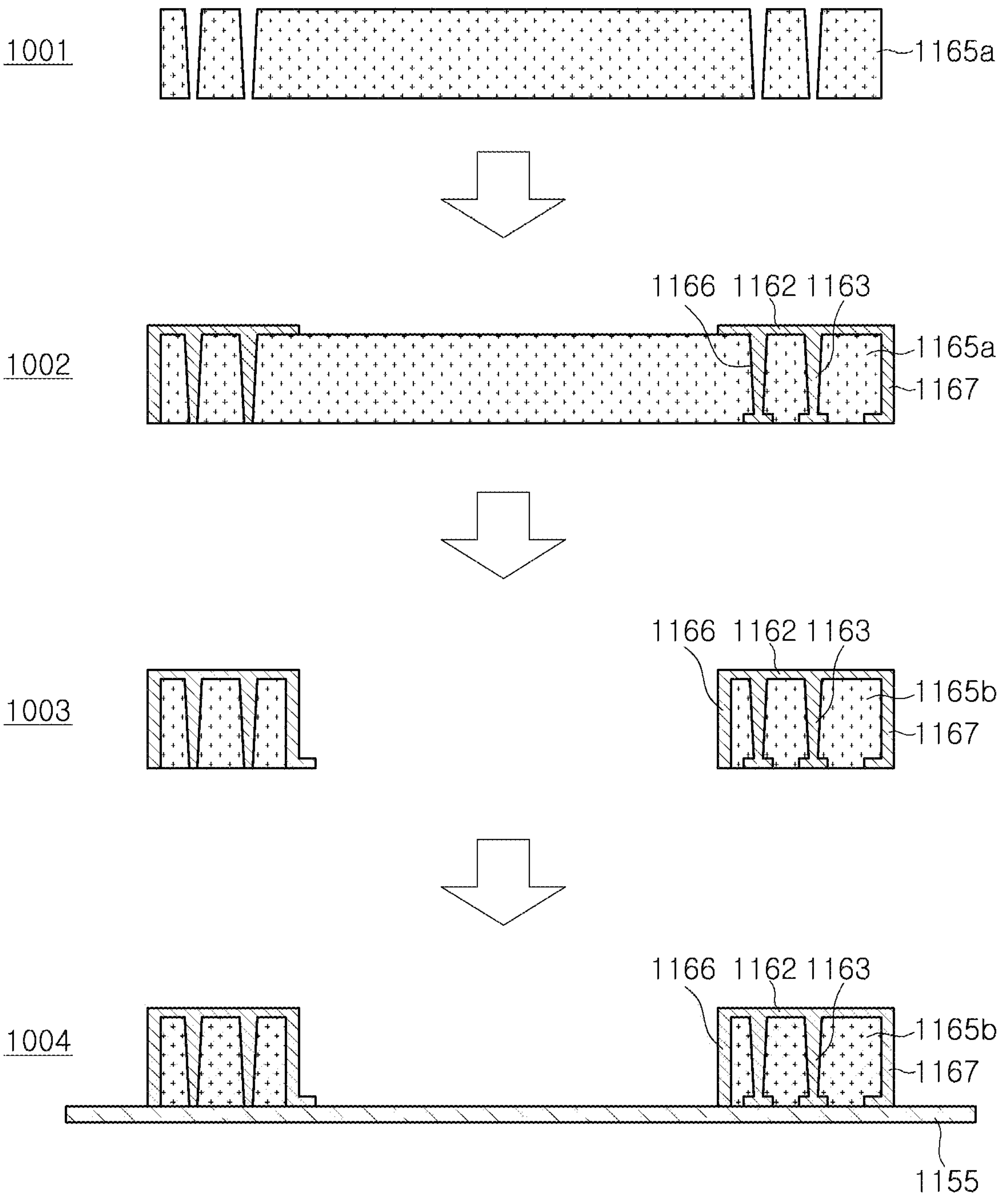
FIGS. 4A and 4B are side views illustrating an example process of manufacturing a chip radio frequency package, in accordance with one or more embodiments.
Figure 4B:
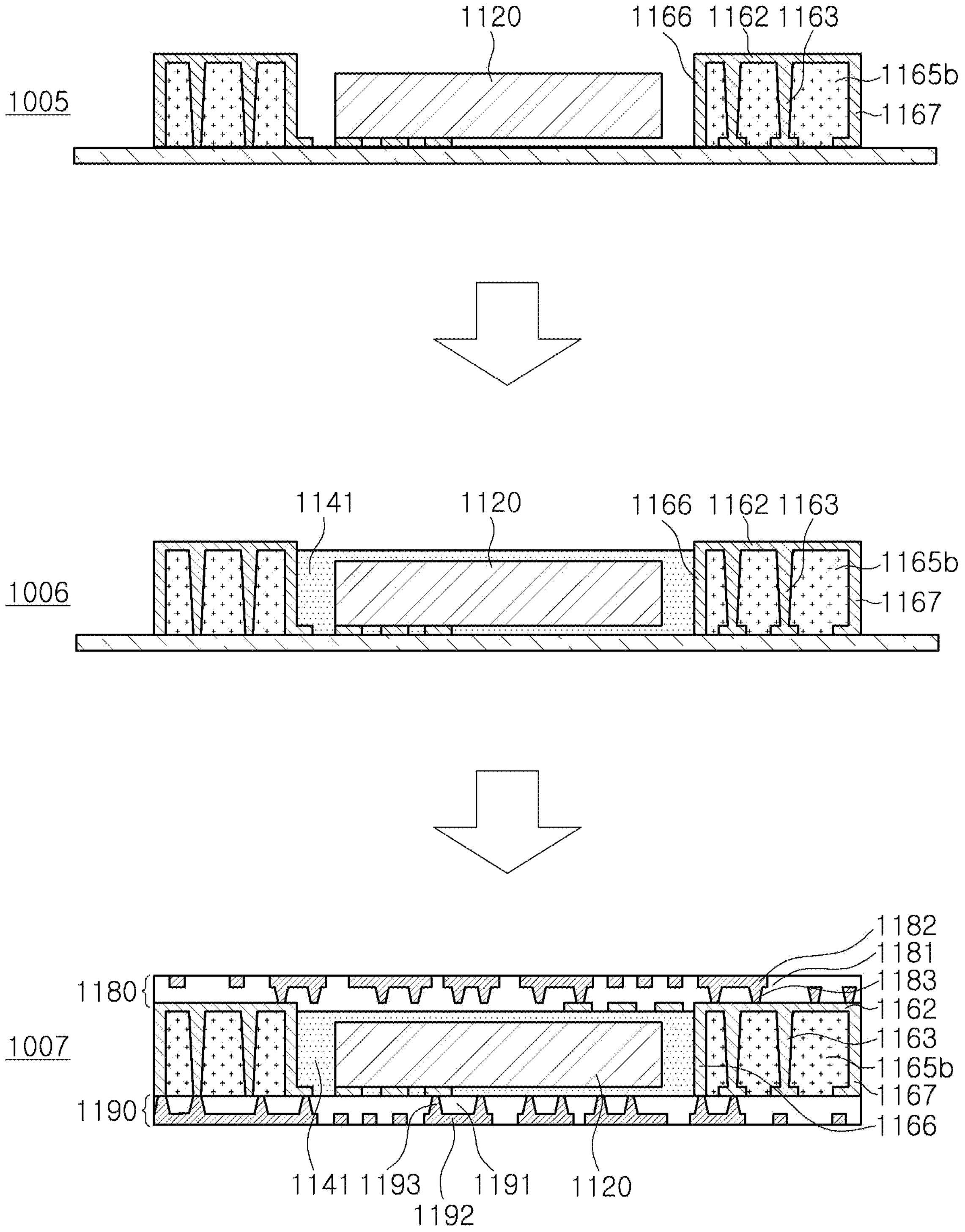

FIGS. 4A and 4B are side views illustrating a process of manufacturing a chip radio frequency package, in accordance with one or more embodiments.

Referring to FIG. 4A, in operation 1001, a portion in which a core via is to be disposed in a core insulating layer 1165*a* may be removed.

Referring to FIG. 4A, in operation 1002, the core via 1163 may be formed to penetrate the core insulating layer 1165*a*, and a core wiring layer 1162 may be disposed on an upper surface and/or a lower surface of the core insulating layer 1165*a*, and a second plating layer 1167 may be disposed on an outer wall of the core insulating layer 1165*a*.

Referring to FIG. 4A, in operation 1003, a through-hole may be formed in a core insulating layer 1165*b*, and a first plating layer 1166 may be disposed on an inner wall of the core insulating layer 1165*a*.

Referring to FIG. 4A, in operation 1004, a support unit 1155 may be disposed on a lower surface of the core insulating layer 1165*b*.

Referring to FIG. 4B, in operation 1005, a FEIC 1120 may be disposed in the through-hole.

Referring to FIG. 4B, in operation 1006, a first encapsulant 1141 may be filled in a portion where the FEIC 1120 is not located in a through-hole.

Referring to FIG. 4C, in operation 1007, a first connection member 1190 may be disposed on a lower surface of the core insulating layer 1165*b*, and a second connection member 1180 may be disposed on an upper surface of the core insulating layer 1165*b*.

The first connection member 1190 may include a first insulating layer 1191, a first wiring layer 1192, and a first via 1193, and the second connection member 1180 may include a second insulating layer 1181, a second wiring layer 1182 and a second via 1183.

Figure 5A:
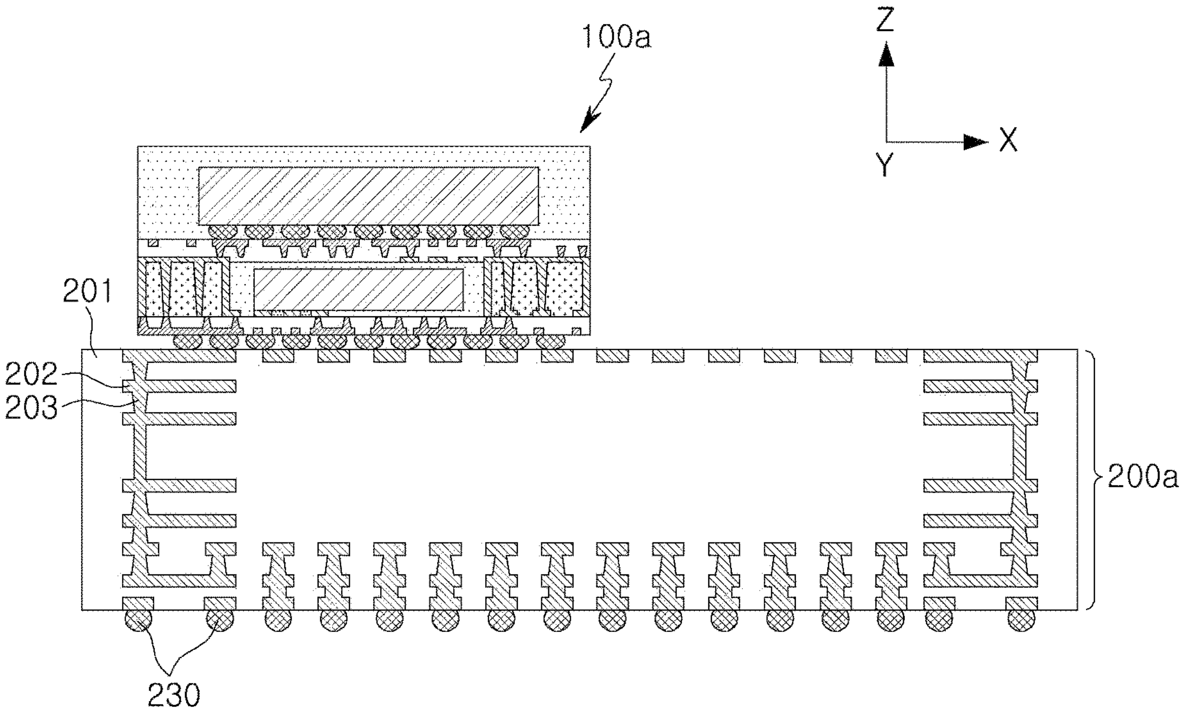
FIGS. 5A and 5B are side views illustrating an example radio frequency module, in accordance with one or more embodiments.
Figure 5B:
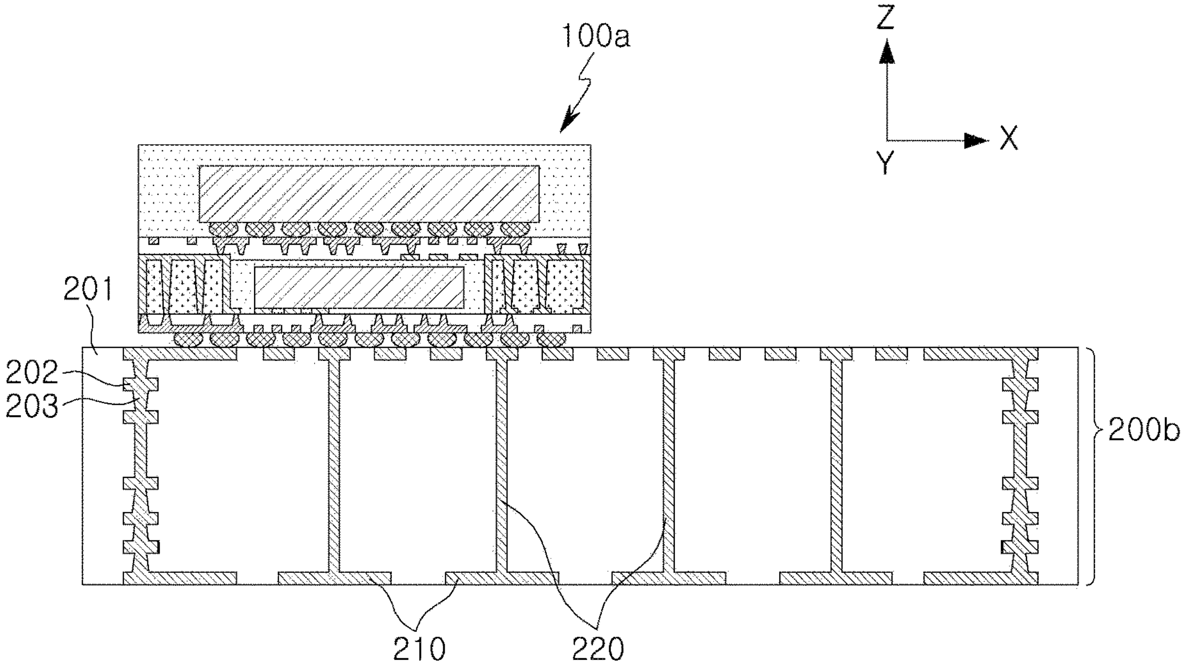

FIGS. 5A and 5B are side views illustrating an example radio frequency module, in accordance with one or more embodiments.

Referring to FIG. 5A, an example radio frequency module may include a chip radio frequency package 100*a* and a substrate 200*a*.

The substrate 200*a* may have a structure in which a third insulating layer 201, a third wiring layer 202, and a third via 203 are combined, and may have a structure similar to that of the printed circuit board (PCB).

As the number of stacked layers of the connection member of the chip radio frequency package 100*a* increases, the number of the third insulating layer 201 and the third wiring layer 202 of the substrate 200*a* may decrease, such that the thickness of the substrate 200*a* may become thinner.

In an example, the chip radio frequency package 100*a* may be mounted on the upper surface of the substrate 200*a* through an electrical connection structure, and may be electrically connected to the third wiring layer 202 and the third via 203.

A horizontal width of the chip radio frequency package 100*a* may be smaller than a width of the upper surface of the substrate 200*a*. Therefore, the chip radio frequency package 100*a* may be used as one electronic component from a viewpoint of the substrate 200*a*.

A plurality of third electrical connection structures 230 may be disposed on the lower surface of the substrate 200*a*, and may be electrically connected to the third wiring layer 202 and the third via 203.

The plurality of third electrical connection structures 230 may support the mounting of a chip antenna, and, in an example, the chip antenna may remotely transmit and/or receive the second RF signal. Additionally, a portion of the plurality of third electrical connection structures 230 may be used as an input and/or output path of the base signal.

Referring to FIG. 5B, in an example, a substrate 200*b* may further include a plurality of patch antenna patterns 210 and a plurality of feed vias 220.

The plurality of patch antenna patterns 210 may be formed together with a wiring layer of the substrate 200*b*, may remotely transmit and/or receive a second RF signal, and may be fed from the plurality of feed vias 220.

Figure 6:
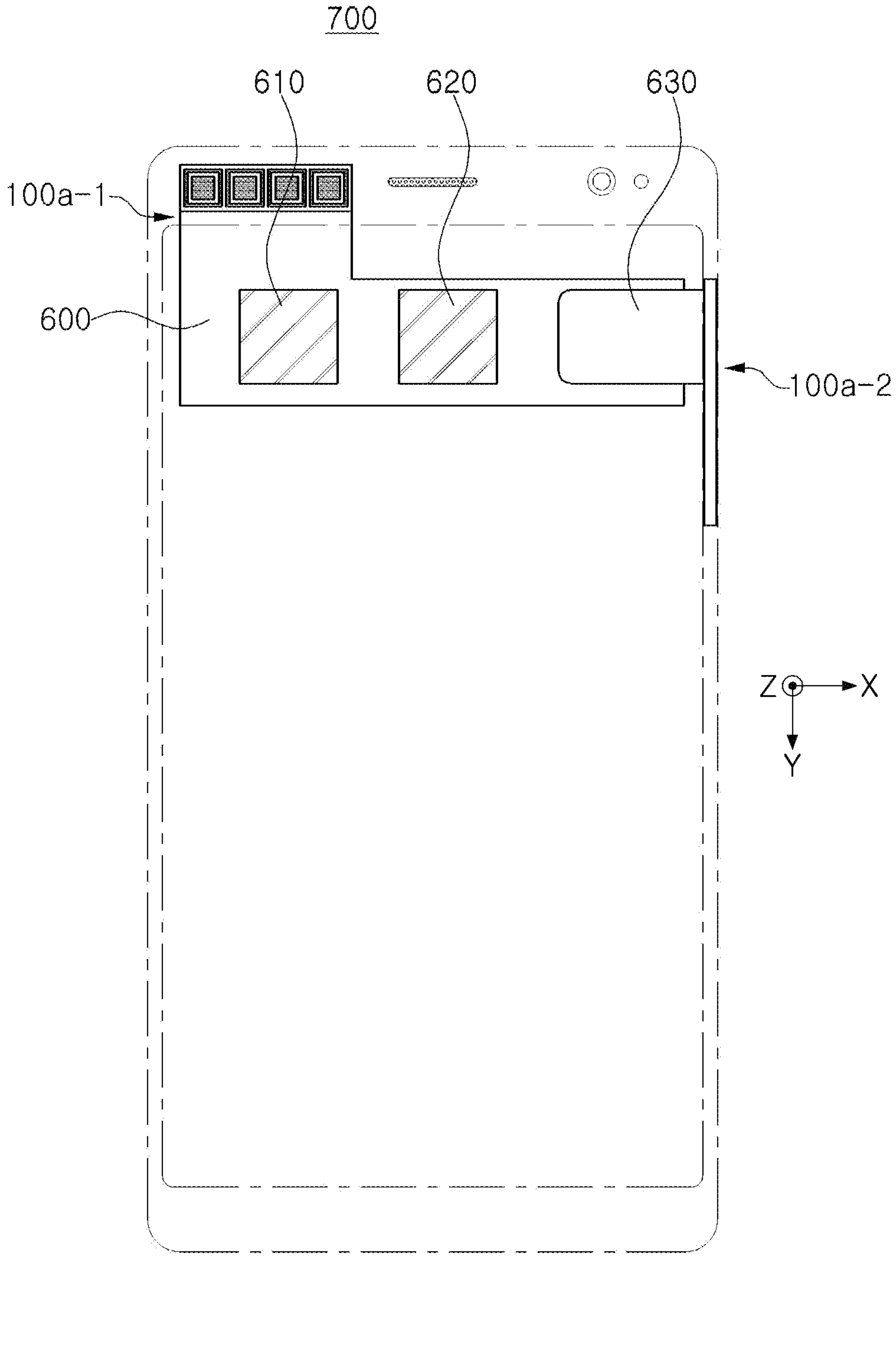
FIG. 6 is a plan view illustrating an example disposition of a radio frequency module in an electronic device, in accordance with one or more embodiments.

FIG. 6 is a plan view illustrating an example disposition in an electronic device of a radio frequency module, in accordance with one or more embodiments.

Referring to FIG. 6, radio frequency modules 100*a*-1 and 100*a*-2, in accordance with one or more embodiments, may be disposed adjacent to a plurality of different edges of an electronic device 700, respectively.

In a non-limiting example, the electronic device 700 may be a smartphone, a personal digital assistant, a digital video camera, a digital still camera, a network system, a computer, a monitor, a tablet PC, a laptop computer, a netbook computer, a television set, a video game, a smartwatch, an automobile, or may be an apparatus provided in, autonomous vehicles, robotics, smartphones, tablet devices, augmented reality (AR) devices, Internet of Things (IoT) devices, and similar devices, but the present disclosure is not limited thereto, and may correspond to various other types of devices.

The electronic device 700 may include a base substrate 600, and the base substrate 600 may further include a communication modem 610 and a baseband IC 620.

The communication modem 610 may include at least a portion of: a memory chip such as at least one of a volatile memory or a nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the storage device 820 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

The communication modem 610 may include an application processor chip such as a central processor (for example, a central processing unit (CPU)), a graphics processor (for example, a graphics processing unit (GPU)), a digital signal processor, a cryptographic processor, a microprocessor, a microcontroller, or the like; and a logic chip such as an analog-to-digital converter, an application-specific integrated circuit (ASIC), or the like, to perform digital signal processing.

The baseband IC 620 may perform analog-to-digital conversion, amplification, filtering, and frequency conversion on the analog signal to generate a base signal. The base signal input/output from the baseband IC 620 may be transferred to radio frequency modules 100*a*-1 and 100*a*-2 through the coaxial cable, and the coaxial cable may be electrically connected to an electrical connection structure of the radio frequency modules 100*a*-1 and 100*a*-2.

For example, a frequency of the base signal may be a baseband, and may be a frequency (e.g., several GHz) corresponding to an intermediate frequency (IF). A frequency of the RF signal (e.g., 28 GHz, 39 GHz) may be higher than the IF, and may correspond to a millimeter wave (mmWave).

The wiring layers, vias, and patterns, disclosed herein may be formed of metal materials (e.g., a conductive material such as copper (Cu), aluminum (Al), silver (Ag), tin (Sn), gold (Au), nickel (Ni), lead (Pb), titanium (Ti), alloys thereof, or the like), and may be formed according to plating methods such as chemical vapor deposition (CVD), physical vapor deposition (PVD), sputtering, subtractive, additive, a semi-additive process (SAP), a modified semi-additive process (MSAP), or the like, but is not limited thereto.

The insulating layer may be implemented by a prepreg, FR4, a thermosetting resin such as epoxy resin, a thermoplastic resin, or a resin formed by impregnating these resins in a core material such as a glass fiber, a glass cloth, a glass fabric, or the like, together with an inorganic filler, Ajinomoto Build-up Film (ABF) resin, bismaleimide triazine (BT) resin, a photoimageable dielectric (PID) resin, a copper clad laminate (CCL), a ceramic-based insulating material, or the like.

The RF signals may have a format according to W-Fi (IEEE 802.11 family, etc.), WiMAX (IEEE 802.16 family, etc.), IEEE 802.20, LTE (long term evolution), Ev-DO, HSPA+, HSDPA+, HSUPA+, EDGE, GSM, GPS, GPRS, CDMA, TDMA, DECT, Bluetooth, 3G, 4G, 5G and any other wireless and wired protocols specified thereafter, but is not limited thereto. In addition, the frequency of the RF signal (e.g., 24 GHz, 28 GHz, 36 GHz, 39 GHz, 60 GHz) is greater than the frequency of the IF signal (e.g., 2 GHz, 5 GHz, 10 GHz, etc.).

As set forth in the examples, a chip radio frequency package and a radio frequency module may have an improved processing performance for a radio frequency signal (e.g., power efficiency, amplification efficiency, frequency conversion efficiency, heat dissipation efficiency, noise robustness, etc.) or have a reduced size.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A chip radio frequency package, comprising:

a core member including a through-hole, a core insulating layer, and a core via disposed to penetrate the core insulating layer;

a front-end integrated circuit (FEIC) disposed in the through-hole;

a first connection member, disposed on a lower surface of the core member, and having a first stacked structure in which at least one first insulating layer and at least one first wiring layer are alternately stacked, and the first wiring layer is electrically connected to the core via;

a second connection member, disposed on an upper surface of the core member, having a second stacked structure in which at least one second insulating layer and at least one second wiring layer are alternately stacked, and the second wiring layer is electrically connected to the core via; and a radio frequency integrated circuit (RFIC) disposed on an upper surface of the second connection member, and configured to input or output a base signal and a first radio frequency (RF) signal having a frequency higher than a frequency of the base signal, through the at least one second wiring layer, wherein the FEIC is configured to input or output the first RF signal and a second RF signal which has a power different from a power of the first RF signal.

2. The chip radio frequency package of claim 1, wherein the FEIC is configured to input or output the first RF signal and the second RF signal in a vertical direction.

3. The chip radio frequency package of claim 1, wherein the first connection member is disposed below the core member, and the second connection member is disposed above the core member.

4. The chip radio frequency package of claim 3, further comprising a first encapsulant that encapsulates the FEIC in the through-hole.

5. The chip radio frequency package of claim 4, further comprising a second encapsulant that encapsulates at least a portion of the RFIC on an upper surface of the second connection member.

6. The chip radio frequency package of claim 1, wherein the FEIC is disposed between the first connection member and the second connection member.

7. The chip radio frequency package of claim 1, wherein a side surface of the through-hole is perpendicular to an upper surface of the core member.

8. The chip radio frequency package of claim 1, wherein the core member further comprises a plating layer disposed on a side surface of the through-hole.

9. The chip radio frequency package of claim 8, wherein the FEIC is electrically connected to the plating layer.

10. The chip radio frequency package of claim 1, wherein at least a portion of the FEIC overlaps the RFIC in a vertical direction.

11. A radio frequency module, comprising:

a core member including a through-hole, a core insulating layer, and a core via disposed to penetrate the core insulating layer;

a front-end integrated circuit (FEIC) disposed in a through-hole of the core member;

a first connection member, disposed on a lower surface of the core member, and having a first stacked structure in which at least one first insulating layer and at least one first wiring layer are alternately stacked, and the first wiring layer is electrically connected to the core via;

a second connection member, disposed on an upper surface of the core member, having a second stacked structure in which at least one second insulating layer and at least one second wiring layer are alternately stacked, and the second wiring layer is electrically connected to the core via;

a radio frequency integrated circuit (RFIC) disposed on an upper surface of the second connection member, and configured to input or output a base signal and a first radio frequency (RF) signal having a frequency higher than a frequency of the base signal, through the at least one second wiring layer;

a substrate disposed on a lower surface of the first connection member; and an electrical connection structure configured to electrically connect the first connection member and the substrate, wherein the FEIC is configured to input or output the first RF signal and a second RF signal which has a power different from a power of the first RF signal.

12. The radio frequency module of claim 11, wherein the substrate comprises a patch antenna pattern configured to transmit or receive the first RF signal or the second RF signal; and a feed via configured to feed the patch antenna pattern.

13. The radio frequency module of claim 11, wherein the first connection member is disposed below the core member, and the second connection member is disposed above the core member.

14. The radio frequency module of claim 11, wherein the FEIC is disposed between the first connection member and the second connection member.

15. The radio frequency module of claim 11, wherein the core member further comprises a plating layer disposed on a side surface of the through-hole.

16. The radio frequency module of claim 11, wherein a lower surface of the first connection member is smaller than an upper surface of the substrate.

17. A chip radio frequency package comprising:

a first connection member including a first insulating layer and a first wiring layer;

a second connection member including a second insulating layer and a second wiring layer;

a core member disposed between the first connection member and the second connection member, and configured to be electrically connected to the first wiring layer and the second wiring layer;

a radio frequency integrated circuit (RFIC), disposed above the second connection member, and configured to process a base signal and a first radio frequency (RF) signal, and a front-end signal integrated circuit (FEIC), disposed in a through-hole of the core member, and configured to amplify the first RF signal to generate a second RF signal, or amplify the second RF signal to generate the first RF signal, wherein the FEIC is configured to process the first RF signal and a second RF signal which has a power different from a power of the first RF signal.

18. The chip radio frequency package of claim 17, wherein the core member further comprises a first plating layer disposed on a side surface of the through-hole, and a second plating layer disposed on an outer wall of the core member.

* * * * *